(12) United States Patent
Cook et al.

(10) Patent No.: US 8,739,841 B2
(45) Date of Patent: Jun. 3, 2014

(54) RFID VENT TUBE APPARATUS, SYSTEM AND METHODS FOR VENT TUBE INTRUSION DETECTION

(75) Inventors: Grant Cook, St. Charles, IL (US); Daniel Namie, Elburn, IL (US)

(73) Assignee: Dorcia, LLC, Addison, IL (US)

( * ) Notice: Subject to any disclaimer, the term of this patent is extended or adjusted under 35 U.S.C. 154(b) by 479 days.

(21) Appl. No.: 12/984,414

(22) Filed: Jan. 4, 2011

(65) Prior Publication Data

US 2011/0162333 A1 Jul. 7, 2011

Related U.S. Application Data

(60) Provisional application No. 61/335,258, filed on Jan. 4, 2010.

(51) Int. Cl.
*B65B 3/04* (2006.01)
*B67C 3/00* (2006.01)
*B65B 57/00* (2006.01)
*B65B 3/18* (2006.01)

(52) U.S. Cl.
CPC . *B67C 3/007* (2013.01); *B65B 3/18* (2013.01); *B65B 57/00* (2013.01)
USPC ............... 141/94; 141/98; 73/865.8; 277/317

(58) Field of Classification Search
CPC ............ B67C 3/007; B65B 3/18; B65B 57/00
USPC ......... 141/50, 94, 98, 309; 73/865.8; 277/317
See application file for complete search history.

(56) References Cited

U.S. PATENT DOCUMENTS

| | | | |
|---|---|---|---|
| 3,090,408 A * | 5/1963 | Naecker | 141/57 |
| 3,742,989 A * | 7/1973 | Campbell et al. | 141/371 |
| 4,513,797 A | 4/1985 | Tompkins, Jr. | |
| 4,530,384 A | 7/1985 | Boyes | |
| 4,688,608 A * | 8/1987 | Puskarz et al. | 141/39 |
| 4,911,570 A | 3/1990 | Rhoades | |
| 5,697,406 A | 12/1997 | Trunek et al. | |
| 5,878,797 A | 3/1999 | Manuel et al. | |
| 6,109,483 A | 8/2000 | Wilke et al. | |
| 6,179,016 B1 * | 1/2001 | Neacker et al. | 141/39 |
| 7,197,932 B2 * | 4/2007 | Sakai et al. | 73/598 |

(Continued)

FOREIGN PATENT DOCUMENTS

JP  2003095390 A  *  4/2003  ............... B67C 3/22

OTHER PUBLICATIONS

Machine translation of JP 2003-95390, Apr. 2003, all pages.*

(Continued)

*Primary Examiner* — Gregory Huson
*Assistant Examiner* — Nicolas A Arnett
(74) *Attorney, Agent, or Firm* — Jeffrey A. Pine; Dykema Gossett PLLC

(57) ABSTRACT

The present invention is directed to a vent tube apparatus, system and methods incorporating a traceable material such as a Radio Frequency Identification (RFID) tag for use in conjunction with a filling machine during container filling operations for a quicker and more accurate detection of the location of the vent tube after it has become detached from a filling machine during filling operations, and to increase the safety of the filling operation and reduce costs and time when a malfunction occurs.

18 Claims, 4 Drawing Sheets

(56) References Cited

U.S. PATENT DOCUMENTS

| 7,347,231 B2 | 3/2008 | Schmoll |
| 2005/0199314 A1 | 9/2005 | Ruble et al. |
| 2007/0215239 A1 | 9/2007 | Dorney |

OTHER PUBLICATIONS

PCT International Search Report and Written Opinion, PCT/US11/020131, Filing Date Jan. 4, 2011, filed from corresponding present U.S. Appl. No. 12/984,414, Apr. 6, 2011.

European Search Report and European Search Opinion, EP 11 72 8569, filed from corresponding PCT International Application PCT/US11/020131, Sep. 10, 2013.

David Robson; The Smart Solution, www.imveurope.com, (www.imeurope.com/features/feature.php?feature_id=31), Oct. 20, 2009.

Fortress Phantom Vent Tube Metal Detector, (http://images.vertmarkets.com/crlive/files/downloads/3cc8f73a-cfbe-406d-b2bf-e049bf941362VentTube-Phantom.pdf), Sep. 2009.

Vince Cottone, The Bottling Technology Page, Sound Brewing Systems, Inc., (http://www.soundbrew.com/bottling/bottling.html), 2000.

\* cited by examiner

RFID VENT TUBE APPARATUS, SYSTEM AND METHODS FOR VENT TUBE INTRUSION DETECTION

PRIORITY STATEMENT

This application claims the benefit of U.S. Provisional Application 61/335,258 filed Jan. 4, 2010.

FIELD OF THE INVENTION

The present invention relates to vent tubes incorporating one or more detectors or indicators for use in conjunction with a filling machine during container filling operations to increase the safety of the filling operation and reduce the associated cost and time when a malfunction occurs. In particular, the present invention relates to food or beverage vent tubes incorporating a Radio Frequency Identification (RFID) tag and can incorporate other types of tags or traceable material allowing for a quicker and more accurate detection of an intrusion (and the location) of a food or beverage vent tube that has become detached from a filling machine during filling operations.

BACKGROUND OF THE INVENTION

In the food and beverage industry there is a need for efficient and reliable manufacturing processes to quickly and safely manufacture and package the food and beverage product. Most food and beverage plants across the United States run continuously, 24 hours a day and 7 days a week, to meet the ever increasing demands. With these stringent demands on their machines as well as personnel, most food and beverage plants have implemented some form of process control or automation. By using programmable logic controllers (PLCs) and various other logic controlling devices, elementary applications that used to require manual attention can now be done with machines.

In particular, the demand today for beverage containers filled with product, such as cola and beer, is greater than it has ever been and continues to grow. These containers can be glass bottles, aluminum cans or any type of canister that can store, for example, consumable beverages, automobile product, hair and skin care product, and any other liquid or semi-liquid product that is packaged and distributed in such a container. These container packages can be any size and shape, such as those found in 12 ounce cola or beer cans and bottles, and the various bottles containing hair care product. These containers can be made from many different materials, such as glass, plastic, aluminum, tin among others, and are enclosed, after being filled with product, using a type of cap or top attached by screwing onto the container, crimping, pressing or heat sealing, or in other ways to enclose the product in the container.

In order to meet this demand for liquid and semi-liquid product, high speed, automatic filling machines are incorporated in the filling process. These automatic machines can load, fill, enclose, and box up thousands of these containers each minute in a high-speed operation. These automatic filling machines load the empty containers onto a conveyor and move the bottles into a location on the machines where the containers come in contact with the filling machine and are filled with product. Once filled, the containers are enclosed or sealed and are quickly moved away from the filling station, and boxed up or packaged along with other filled containers to be shipped or distributed to retail centers and the like.

In such a high-speed operation, when an accident or mistake occurs, hundreds or thousands of containers may inadvertently be filled before the filling machine or process can be halted. In these situations, the hundreds or thousands of containers filled after the accident may need to be discarded, wasting time and money to determine which bottles were filled after the accident.

The fill process will vary depending on the product being filled, and various factors, such as the temperature and viscosity of the product, the beverage gas, the effect of those gases and related pressure characteristics during the filling process. Accordingly, the filling process and related conditions can be optimized and maximized monitoring and controlling these factors. For purposes of this application and for simplicity, most of the examples herein will refer to a carbonated beverage filling process, although the apparatus, system and methods described herein relate to any similar type of filling process.

Further, the filling process can not alter the food or beverage being filled. Thus, when planning a filling system it is important to match the appropriate filling steps to the beverage characteristics and container. The steps of the filling process include some or all of the following: evacuation of the container, flushing the container with gas, pressurizing the container with gas, filling the container with one or multiple speeds, fill level correction (in certain cases), and settling the product.

Evacuation is used mostly on rigid containers in which a vacuum process removes upwards of 90% of the air content in the container prior to pressurizing with gas. Evacuation becomes more important when the contents being filled are oxygen sensitive and the may be repeated at other times throughout the filling process. Additionally or alternatively, the container may be flushed with gas. This is done mostly with flexible containers, such as PET bottles and aluminum cans, which may not be able to withstand a vacuum. The flushing step takes place at the time that the fill valve is located at the container and usually uses gas from the filling ring bowl until both pressures are the same.

Next, filling takes place when the fill valve opens and the product flows over and around the vent tube and into the container. As the container fills, gas in the containers is displaced by the product and flows through the vent tube and out of the container into the filler ring bowl, until the container is full. As an example, the vent tube may contain an electronic probe to detect product and stop filling. Accordingly, the vent tube vents the gases being used while filling the container with fluid. The process needs to be extremely accurate, and as a result most vent tubes are designed at specific lengths to achieve each specific fill level per filling machine.

Fill level correction may be incorporated when the cost of product is high to save product. In the most commonly used fill level correction step, the container is first overfilled with product and then the product is extracted using a vacuum through the vent tube. Finally, by settling, the pressure in the container is lowered and the beverage is allowed to settle as it is lowered from the fill valve.

The vent tubes used in the filling process described above usually are configured with an elongated, hollow, cylindrical tube extending the length of the tube which allows the vent tube to enter the container opening during the fill process without touching the container. As described above and in U.S. Pat. No. 3,736,966, which is incorporated by reference herein, the product can flow over the vent tube into the container. The lower tip of the vent tube is usually closed and one or more holes are provided so that any gas or air in the container can be displaced through the vent tube during the filling process, minimizing or eliminating the possibility of a container exploding during filling Traditionally, filling machines for glass containers use a vent tube made of stainless steel or a stainless food-grade plastic hybrid. For filling aluminum containers, the vent tube is usually made from some form of food-grade plastic, such as Delrin®. Vent tubes can also use a ball and cage system as described in U.S. Publication No. US20050199314 A1, which is incorporated by reference herein.

Due to the high speeds and constant use of these filling machines, occasionally a vent tube may detach from the filling machine and fall into the product container. When this event occurs there are minimal systems in place to halt the filling process, locate the detached vent tube, repair the filling machine and begin the process again. Each minute that the process is halted equates to thousands of unfilled containers, as filling machines can run at speeds of 1650 cans per minute. Further, the longer the process continues, the more filled containers that will have to be examined to find the detached vent tube. In many situations, the containers filled with product that were boxed up or packaged after the vent tube became detached are merely discarded, increasing the costs of the accident.

Some of the current systems used to check for detached stainless steel vent tubes include the use of inductive or capacitive sensors, vision systems or other ultrasonic inline systems. Additionally, systems for determining when a vent tube has become detached and fallen into the container include the electromagnetic detection fields or X-ray based technologies. Some of the manufactures of these technologies include Omron Corporation, Industrial Dynamics Company, and the Fortress Technology Inc, among others.

However, most of these inspection systems need to have direct access to each and every container after it has been filled with product, and are used as a way to detect the vent tube by examining each container. This process either slows down the filling line because each and every container must be examined, or takes longer time than necessary to find the container in which the vent tube has fallen if each container has not been examined.

Further, some of the systems work better with metal vent tubes, while other systems work better with plastic vent tubes creating inconsistencies, or the need for additional equipment when changing to different vent tubes. For example, when a plastic vent tube falls into a can made of aluminum at a filling plant, the inductive and capacitive technologies cannot detect the plastic vent tube (foreign) object through the aluminum can.

There is currently no apparatus, system or method that incorporates an indicator, such as an RFID tag, into a vent tube for use during filling operations, that increases the safety of the filling operation and reduces the costs and time when a malfunction occurs, such as when a vent tube detaches from the filling machine and falls into the container. There is also no apparatus, system or method relating to vent tubes incorporating an RFID tag that allows for a quicker and more accurate determination of the location of a vent tube that has become detached from a filling machine during filling operations. The present invention satisfies these needs.

SUMMARY OF THE INVENTION

In order to solve the above-mentioned shortcomings in filling operations, the present invention utilizes apparatus, system and/or methods for determining the location of a vent tube when it malfunctions and becomes detached from a filling machine and, in special cases, falls or intrudes into a container being filled. In particular, the invention utilizes a vent tube modified with a traceable material, such as an RFID tag, and can incorporate a system and methods for scanning a filling machine, as well as food or beverage containers, using sensing technologies, such as RFID technology.

The present invention solves the problems facing the packaging industry, and in particular, the beverage filling industry as described above. The present invention incorporates a solution for consistent detection of vent tube intrusion into a container, which exceeds the current standards at specific beverage manufacturing plants.

At large automated beverage manufacturing plants, aluminum cans are a commonly used container for product. As described above, when a plastic vent tube falls into aluminum can as it is being filled, the inductive and capacitive technologies normally used to detect metal vent tube, cannot detect the plastic foreign object through the aluminum can. As a result expensive X-ray systems used or product is considered waste.

The present invention solves this inherent problem by incorporating or implementing an RFID tag into each vent tube and associated monitoring systems. The incorporated RFID tag can be used on metal, metal-plastic hybrid, ball cage, and plastic vent tubes with the same result. By placing an in-line identification gate or RFID scanner or reader after the filling process occurs, and a continuous monitoring system on the filling machine any such vent tube can be reliably tracked if it becomes detached from the filling machine during the filling process.

By tagging the vent tube with an RFID transponder or other tagging technologies, routine consistency checks will not have to be performed. Further, other materials may now be considered as containers for the packaging side of the manufacturing facilities.

The vent tube detection system used in conjunction with the present invention has several components, such as chips, tags, readers and antennas. By incorporating an RFID tag or transponder or other tagging technology into the vent tube, the vent tube can be tracked using the same transponder or tag reading system as described above. Since the transponder is created by attaching a small silicon chip to a small flexible antenna, the chip can be used to record and store information. To read the transponder and locate the specific vent tube, the RFID reader sends out a radio signal to be absorbed by the antenna and reflected back as a return signal delivering information from the transponder chip memory.

In use, the container filling machine operates in its normal manner with empty containers sent down a conveyor to the filling section of the system. The vent tube is then lowered (or the empty container is raised) to come in contact or near contact with the container. The container is filled with the product as described above, and the vent tube is separated from the filled container. The filled container is then covered and/or sealed. This filling process fills thousands of containers each minute.

If, during these high-speed operations, a vent tube malfunctions (i.e., detaches or sheers from the filling machine, and falls into the container), the RFID transponder incorporated into the vent tube will likewise fall into the filled container. Using the vent tube detection system, the system can have immediate information that the vent tube has detached from the filling system and precisely which container the vent tube is located. The reader can be anywhere from 1 foot to 20 to 30 feet from the location of the container or filling machine depending on the type of RFID tag used. Further, handheld RFID tag readers can be used at the time of the malfunction to assist in finding the broken vent tube.

The vent tube detection system can be set up at various locations in the filling plant in order to make sure that a vent tube has not been accidentally been misplaced into a filled container before the container is shipped out of the plant.

These and other aspects, features, and advantages of the present invention will become more readily apparent from the attached drawings and the detailed description of the preferred embodiments, which follow.

DRAWINGS

The preferred embodiments of the invention will be described in conjunction with the appended drawings provided to illustrate and not to the limit the invention, where like designations denote like elements, and in which.

DETAILED DESCRIPTION

As described herein, product, such as cola or beer, is transferred from the production, brewing or fabrication stage to the packaging stage to be individually packaged for sale. This transfer process is known as the fill or filling process and utilizes automatic high-speed filling equipment to fill and seal thousands of containers each minute. Often, these automatic filling machines are of the rotary filler type, which may vary in size from 40, 60, 72, 100, 120 or 180 fill valves and vent tubes per machine, allowing for the filling of thousands of containers each minute that the machine is in use.

Figure 1:
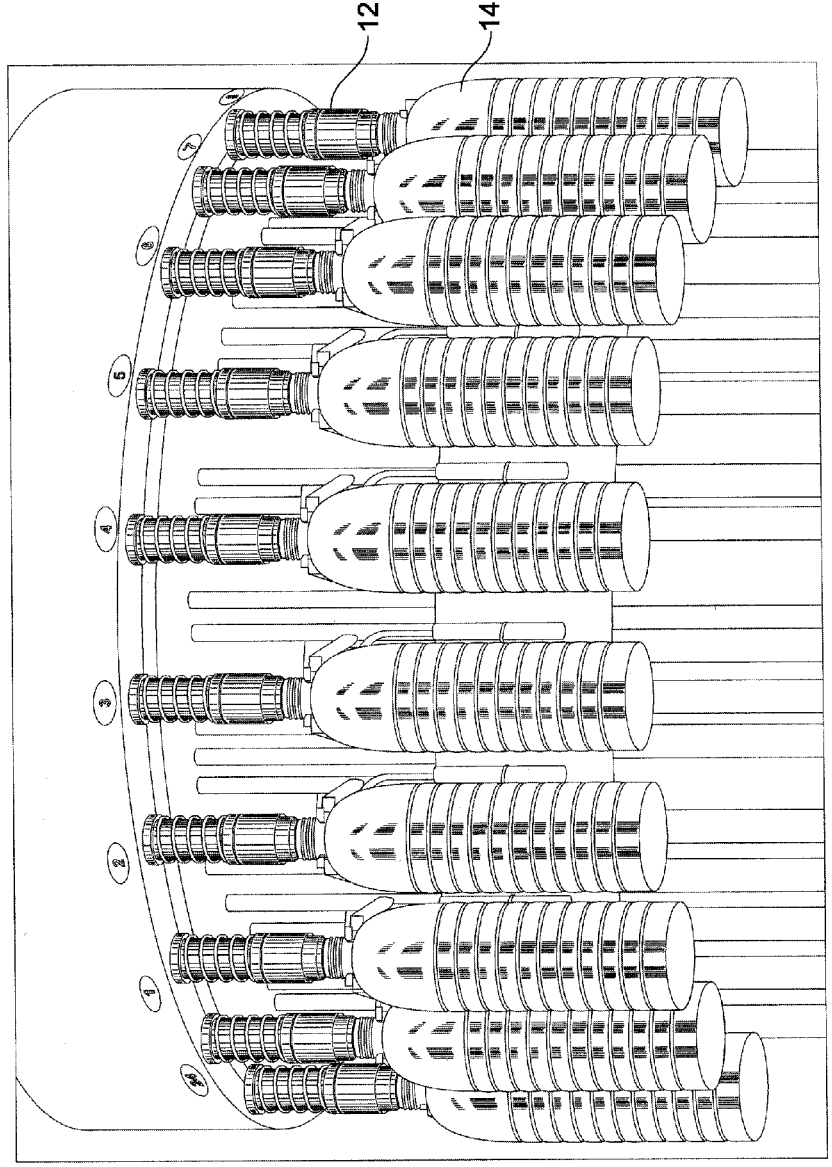
FIG. 1 illustrates a filling machine in accordance with one embodiment of the present invention.

FIG. 1 shows a typical rotary bottle or can filler 10, such as one manufactured by KHS AG, which incorporates vent tubes 12 in the filling (and venting) process. In general terms and as described in more detail herein, a vent tube 12 come in contact or near contact with a container 14 prior to filling the container 14 with the product (not shown). Once a container 14 is in the correct position, product can be transferred to the container 14 with air or gas in the container displaced through the vent tube 12. The container is then sealed or seamed (not shown).

For glass containers 14, the vent tube 12 is usually made of stainless steel, but can be made of a food grade plastic, stainless steel hybrid. For aluminum containers, the vent tube 12 is usually made of a food grade plastic material. In a ball cage vent tube, a food grade plastic ball is used to start and stop the flow of gas.

Due to the high speeds where thousands and tens of thousands of containers are filled each minute, and due to the constant use of these filling machines 10, occasionally a vent tube 12 may detach from the filling machine 10 and fall into the product container 14. If and when this event occurs there are a few primitive systems in place to locate the vent tube 12 and halt the filling process before thousands of additional containers are filled, making it more difficult to locate the container 14 with the broken vent tube 12.

Figure 2:
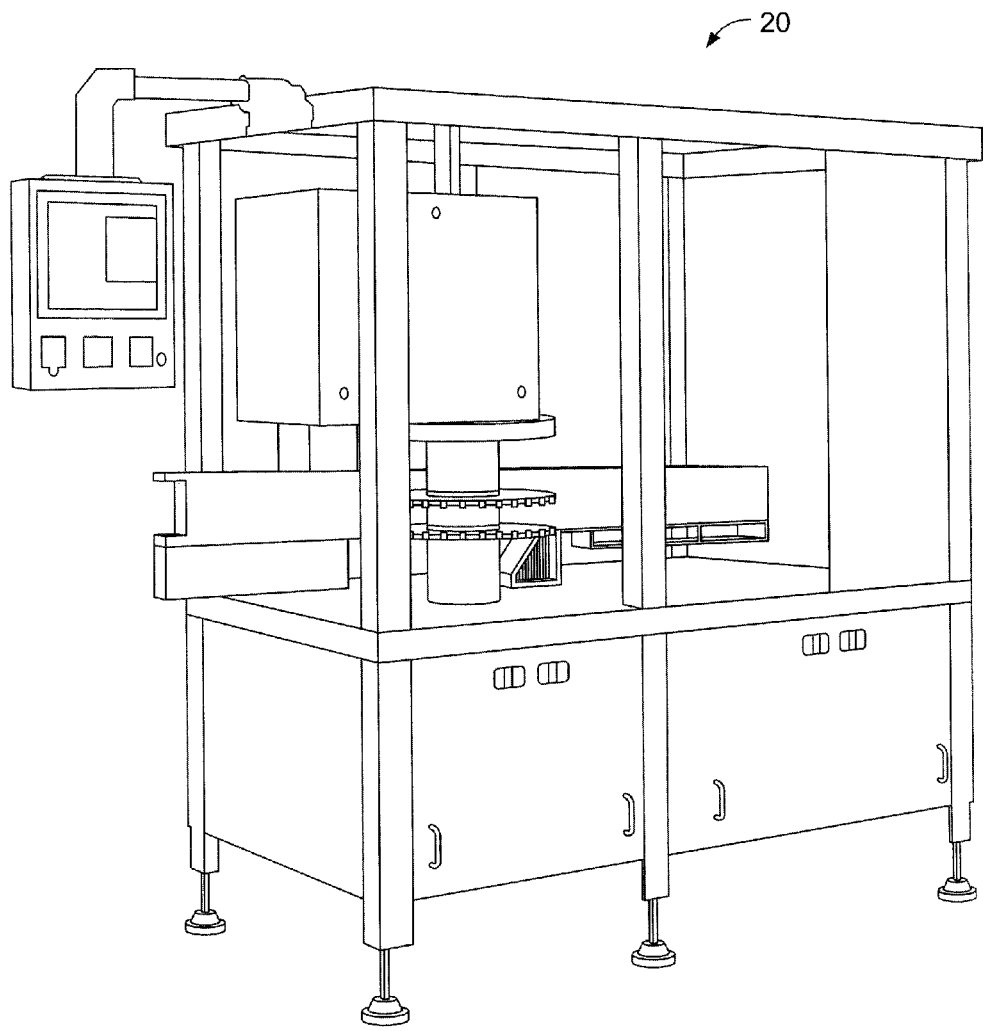
FIG. 2 illustrates an inspection system for inspecting empty and full containers in accordance with the present invention.

FIG. 2 shows a typical container inspection machine 20, such as from the manufacturer Industrial Dymnamics/filtec, in which each filled container must pass before each container can be packaged and distributed. As described herein, these inspection machines 20 utilize various technologies to sense imperfections in the filling process, including when a foreign material, such as a vent tube, falls into a container. The technologies include using inductive and capacitive sensors, vision systems or other ultrasonic inline systems. However, in most of these systems, each container must be individually scanned or tested. For example, the vision system utilizes a light shined through each container (assuming glass or some other translucent material) and a video/vision camera that compares the viewed filled container against a table for any discrepancies. These systems generally slow down the filling process, are expensive and do not always detect a vent tube 12 that has inadvertently detached from the filling machine.

In accordance with the present invention, the vent tube used in the fill process is configured to incorporate a traceable material, such as an RFID tag, a magnet, or in some cases, both. A scanning system and/or method can then be incorporated to check for malfunctions in the filling process and also in which container a malfunctioning vent tube has landed. Further, other types of traceable materials can be used without deviating from the scope of the invention.

Figures 3A, 3B:
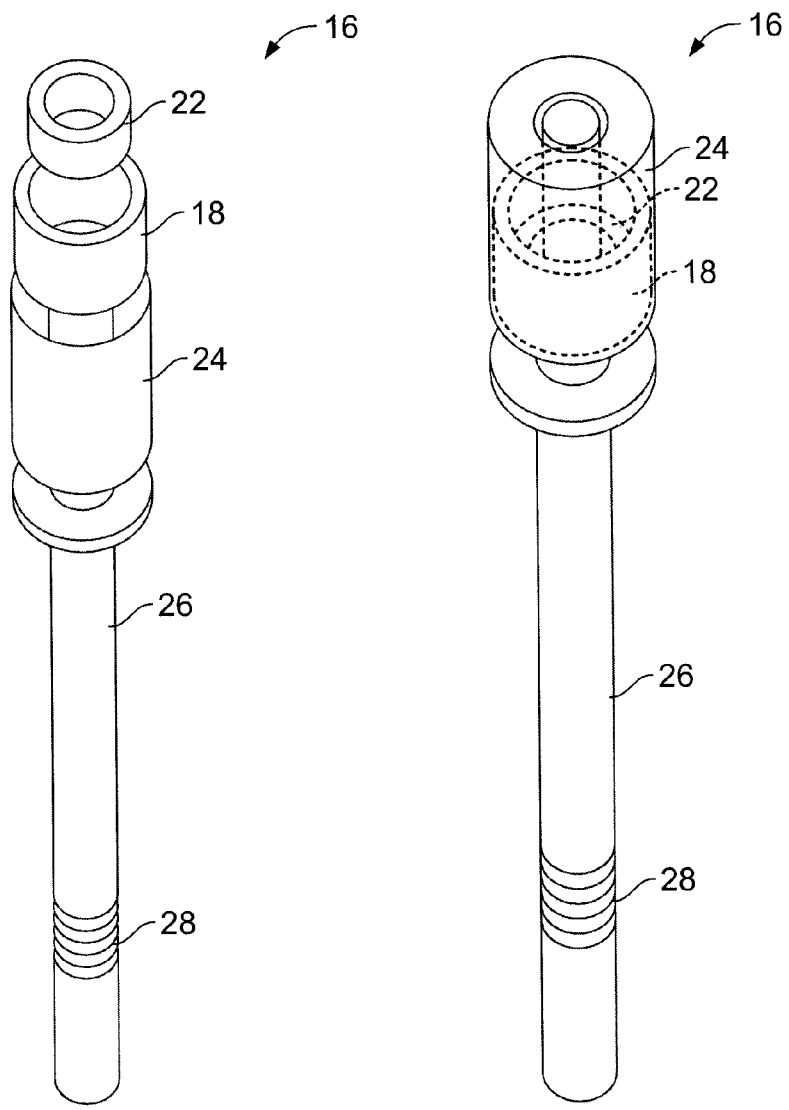
FIGS. 3A and 3B illustrate a vent tube incorporating indicators in accordance with an embodiment of the present invention.

FIGS. 3A and 3B show an exploded view and an assembled view of a vent tube 16 containing a traceable material, respectively. The vent tube 16 comprises an RFID tag 18, a magnet 22, a vent tube head 24, a hollow cylindrical body 26 and indentations 28 for assisting in connecting to the filling machine.

As described herein and in the preferred embodiment, the vent tube 16 incorporates an RFID tag 18 for detection when the vent tube detaches from the filling machine 10. The vent tube 16 can be manufactured from material that will be determined by the standards of the food and beverage industry for each application. The RFID tag 18 can be attached to, or housed or enclosed in, the vent tube 16 through a machining or injection molding process as understood by one having ordinary skill in the art, such that in the preferred embodiment the RFID tag 18 is attached to, or housed or enclosed in, the vent tube head 24.

The vent tube may also incorporate a magnet 22 for additional detection purposes. In some instances, the vent tube only uses a magnet 22 and not the RFID tag 18. In accordance with the present invention, an RFID tag or other traceable material 18 can be placed on any type of vent tube used in the filling process, including ball cage vent tubes. Similar to the RFID tag above, the magnet 22 can be attached to the vent tube 16 in the same manner. The present invention can utilize the RFID tag 18 alone or in conjunction with the magnet 22.

RFID systems have several components, such as chips, tags, readers and antennas, which can be used to determine the location of an RFID tag (and any item that the tag is attached to) from a distance away. In its simplest form, a small silicon chip is attached to a small flexible antenna to create a tag. The chip is used to record and store information and when a tag is to be read, the RFID reader or scanner send out a radio signal. The tag absorbs some of the RF energy from the reader signal and reflects it back as a return signal delivering information from the tag's memory.

The RFID tags 18 do not require a battery, as the power is supplied by the identification gate as understood by one having ordinary skill in the art. Any type of RFID tag 18 can be used in the present invention, Ultra-High Frequency (UHF), High Frequency (HF), and Low Frequency (LF), each providing its own advantages and disadvantages. The higher the frequency, the longer the range for detection; while the lower the frequency, the less power that is needed for the tag to operate. Ranges of 20 to 30 feet are obtainable for the UHF RFID tags, while the HF and LF RFID tags operate at approximate distances of 1 meter and 1 foot, respectively.

As an example, UHF tags operate within the 800 and 900 MHz band and provide a response from a range of 20-30 ft. RFID tags operating in the UHF range can transfer data much faster than RFID tags operating in the HF and LF bands. However, UHF RFID tags require more power than those operating at the HF and LF bands, and are suited more for applications when sensing through low density materials.

RFID tags operating in the HF range primarily operate at 13.56 MHz. These tags require a read distance typically of about 1 meter, and work well when sensing through metal and liquids. RFID tags operating in the LF band have an operating frequency of 125 kHz and work well sensing through product or materials with a high concentration of water. These LF tags must be read with equipment within about a one foot range. However, these LF RFID tags require the least amount of power of the three RFID tags described herein.

RFID readers or scanners are generally composed of a computer and a radio. The computer manages communications with the network or through the Programmable Logic Controller (PLC). The radio controls communication with the RFID tag, typically using a language dictated by a published protocol, such as the EPC Class 1 specification.

When the vent tube 16 of the present invention, containing the RFID tag 18, is used in the filling process, an inspection system, such as an RFID reader, can be incorporated into the filling line or in numerous other locations to continuously check for vent tubes 16 that have detached from the filling machine 10. As soon as a vent tube 16 containing an RFID tag 18 detaches from the filling machine 10, the RFID reader determines that the vent tube 16 is no longer in the correct location and can be used to find the container 14 in which the vent tube 16 is located. This entire inspection and determination procedure takes seconds and can be incorporated into the filling system to immediately shut down the filling process as understood by one having ordinary skill in the art before many more containers are filled.

In the preferred embodiment, the system and methods of the present invention comprise incorporating or housing an RFID tag or transponder in a stainless steel vent tube, for use in glass bottle filling for example, and a plastic vent tube, for use in aluminum can filling for example. The vent tube may also incorporate a magnet along with the RFID transponder. Using an additional traceable material, such as a magnet, increases the detection of the vent tube in certain situations such as when the vent tube falls into an aluminum can and is sealed attenuating the signal.

Figure 4:
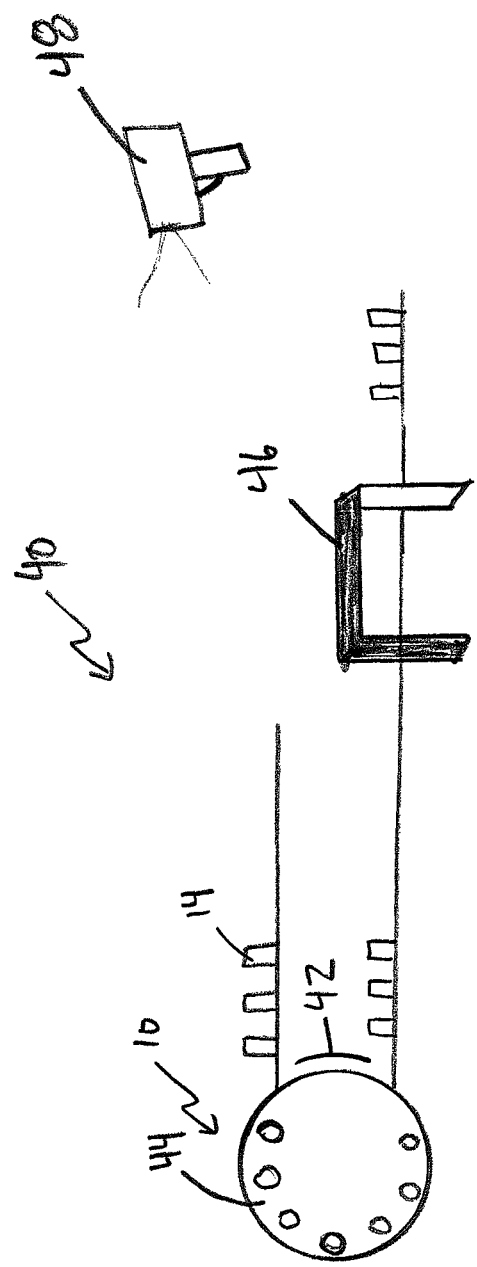
FIG. 4 illustrates an exemplary indicator detection system in accordance with an embodiment of the present invention.

The preferred embodiment of the system 40 and method is shown in FIG. 4, in which there are three points of detection or identification of the vent tubes 16 during the filling process. The first point of detection 42 takes place while the vent tubes 16 are attached to the filler machine 10. An RFID reader 42 is placed close to the filler 44 in a section where no containers 14 are present. As the filler 44 rotates in operation the reader 42 continuously reads the RFID tags 18 that are imbedded in the vent tubes 16 to ensure one or more has not become detached during the filling process. This section 42 of the system 40 will alert the operator if a vent tube 16 becomes detached from the filler 44 and will also provide data indicating the specific filler vent tube 16 position.

The second point of detection 46 takes place on the line after the container 14 has been seamed or sealed. This section 46 of the system 40 utilizes magnetic and inductive sensor technologies to detect the imbedded magnet 22 in the vent tube 16 (or the stainless steel vent tube). This section 46 of the system 40 provides an output to the operator that can be used in an auto reject system or at the operator's discretion.

The third point of detection utilizes a handheld RFID reader 48. After the first 42 or second 46 detection process has identified a vent tube detachment, the operator can now scan the specific can or bottle with the handheld scanner 48 in order to verify the location of the detached vent tube 16.

The present invention does not have to incorporate each of these detection points, and the system can use one or any combination of these detection points to detect and locate a malfunctioning vent tube or a vent tube that has broken off of the filling machine.

The first point of detection, the RFID reader 42, which incorporates an antenna, can be integrated (i.e., through an RFID hardware and/or software integrator) into a local network at the filling site, or it can be connected through a global communications network, such as the Internet, to a remote site as understood by one having ordinary skill in the art. As such, the information received by the reader 42 at the antenna can be transmitted to a number of locations for informational purposes such as record keeping. Further, the second 46 and third 48 points can also be integrated into the system as a whole. Additionally, the system is not limited to three detection points, as the system is scalable and additional detection points can be added for other filling lines and for other scanning purposes, such as to make sure that none of the filled containers being loaded onto a truck have a broken vent tube located inside.

Also, each of the detection points can utilize one or more of the detection methodologies. So for example, the first point of detection 42 may only read RFID tags, while the handheld scanner 48 may be configured to scan for both RFID tags and the magnet.

Other embodiments for determining a malfunction in the filling process 10, such as a vent tube 16 detaching from a filling machine 10 and falling into a container 14, include determining the temperature variant in the bottle as the temperature will change quickly when a vent tube 16 falls into the container 14 filled with product. This embodiment employs measuring the temperature variant in the bottle 14 to detect if a vent tube 16 is present. In a similar manner, determining the change in bottle 14 capacitance, whereby the system measures the capacitance and/or change in capacitance in the bottle 14, can be used to detect an inadvertent vent tube 16. In this embodiment, a charge is applied to the bottle 14 and the system measures charge or discharge time.

Another embodiment for detecting a detached vent tube 16 include utilizing an inductive sensor, where a ferrous material 22 is injection molded inside or into the vent tube 16, or a Hall Effect sensor, where a magnet 22 is injected molded inside or into a vent tube 16. Additional sensors can be used to detect a modified vent tube 16 using Ultra Sonic, Infrasonic or Infrared sensors, or with the use of vision sensors.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. A vent tube apparatus for use in filling a container in a filling machine in which the vent tube is attached to the filling machine, and is configured to vent a gas from the container during the filling process, comprising:
    a vent tube body, said vent tube body being hollow and configured to vent a gas from the container during the filling process;

a vent tube head, said vent tube head attached to one end of said vent tube body; and a Radio Frequency Identification tag, said Radio Frequency Identification tag being housed in said vent tube head, such that if said vent tube detaches from said filling machine, said vent tube can be detected using a Radio Frequency Identification reader.

2. The vent tube apparatus in claim 1, wherein said container is a glass bottle or an aluminum can.

3. The vent tube apparatus in claim 1, wherein said during the filling process means as a product enters the container.

4. The vent tube apparatus in claim 1, wherein said housed in said vent tube head means enclosed during an injection molded process.

5. The vent tube apparatus in claim 1, wherein said housed in said vent tube head means attached during a machining process.

6. The vent tube apparatus in claim 1, further comprising a second indicator, said second indicator being housed in said vent tube head.

7. The vent tube apparatus in claim 6, wherein said second indicator is a magnet.

8. The vent tube apparatus in claim 6, wherein said second indicator being housed in said vent tube head means enclosed during an injection molded process.

9. The vent tube apparatus in claim 6, wherein said second indicator being housed in said vent tube head means attached during a machining process.

10. A container filling system for use in filling a container in which a vent tube is attached to a filling machine, and said vent tube is configured to vent a gas from the container during the filling process, and the system is configured to determine when said vent tube malfunctions, comprising:

a vent tube, said vent tube having a vent tube body, said vent tube body being hollow and configured to vent a gas from the container during the filling process, a vent tube head, said vent tube head attached to one end of said vent tube body, said vent tube having a Radio Frequency Identification tag, said Radio Frequency Identification tag being housed in said vent tube head; and a Radio Frequency Identification reader, said Radio Frequency Identification reader configured to detect said Radio Frequency Identification tag, such that if said vent tube detaches from said filling machine, said vent tube can be detected using said Radio Frequency Identification reader.

11. The vent tube apparatus in claim 10, wherein said container is a glass bottle or an aluminum can.

12. The vent tube apparatus in claim 10, wherein said during the filling process means as a product enters the container.

13. The vent tube apparatus in claim 10, wherein said housed in said vent tube head means enclosed during an injection molded process.

14. The vent tube apparatus in claim 10, wherein said housed in said vent tube head means attached during a machining process.

15. The vent tube apparatus in claim 10, further comprising a second indicator, said second indicator being housed in said vent tube head.

16. The vent tube apparatus in claim 15, wherein said second indicator is a magnet.

17. The vent tube apparatus in claim 15, wherein said second indicator being housed in said vent tube head means enclosed during an injection molded process.

18. The vent tube apparatus in claim 15, wherein said second indicator being housed in said vent tube head means attached during a machining process.

* * * * *